United States Patent
Buckingham et al.

(10) Patent No.: US 11,415,412 B2
(45) Date of Patent: Aug. 16, 2022

(54) MEASUREMENT PROBE APPARATUS AND METHOD

(71) Applicant: RENISHAW PLC, Wotton-under-Edge (GB)

(72) Inventors: Jamie John Buckingham, Plymouth (GB); Michael John Wooldridge, Stroud (GB); Ben Richard Holden, Bristol (GB); Stephen Peter Ewen, Erlestoke (GB)

(73) Assignee: RENISHAW PLC, Wotton-under-Edge (GB)

( * ) Notice: Subject to any disclaimer, the term of this patent is extended or adjusted under 35 U.S.C. 154(b) by 366 days.

(21) Appl. No.: 16/644,048

(22) PCT Filed: Sep. 26, 2018

(86) PCT No.: PCT/GB2018/052729
§ 371 (c)(1),
(2) Date: Mar. 3, 2020

(87) PCT Pub. No.: WO2019/063991
PCT Pub. Date: Apr. 4, 2019

(65) Prior Publication Data
US 2020/0191564 A1    Jun. 18, 2020

(30) Foreign Application Priority Data
Sep. 26, 2017 (EP) .................................... 17193086

(51) Int. Cl.
*G01B 21/04* (2006.01)
*G01B 5/012* (2006.01)
*G01B 7/012* (2006.01)

(52) U.S. Cl.
CPC .......... *G01B 21/047* (2013.01); *G01B 5/012* (2013.01); *G01B 7/012* (2013.01); *G01B 2210/58* (2013.01)

(58) Field of Classification Search
None
See application file for complete search history.

(56) References Cited

U.S. PATENT DOCUMENTS 5,058,433 A * 10/1991 Wilson ................... G01B 7/008
33/561
5,228,352 A *  7/1993 McMurtry ............. G01B 7/012
33/561

(Continued)

FOREIGN PATENT DOCUMENTS

CN          1421675 A      6/2003
CN          1714295 A     12/2005

(Continued)

OTHER PUBLICATIONS

Feb. 8, 2018 Extended Search Report issued in European Patent Application No. 17193086.0.

(Continued)

*Primary Examiner* — Christopher W Fulton
(74) *Attorney, Agent, or Firm* — Oliff PLC

(57) ABSTRACT

A measurement probe is described that includes a probe body, a stylus that is deflectable relative to the probe body, and a plurality of sensor elements for generating a sensor signal indicative of stylus deflection. An analyser is provided, optionally as part of a trigger unit, to analyse the sensor signals and issues a trigger signal to indicate the stylus has contacted an object. The analyser is arranged to combine a plurality of the sensor signals to generate a resultant deflection signal for comparison to a deflection threshold and is also arranged to detect oscillatory motion of the stylus by analysing at least one of the sensor signals. The (Continued)

Figure 1:
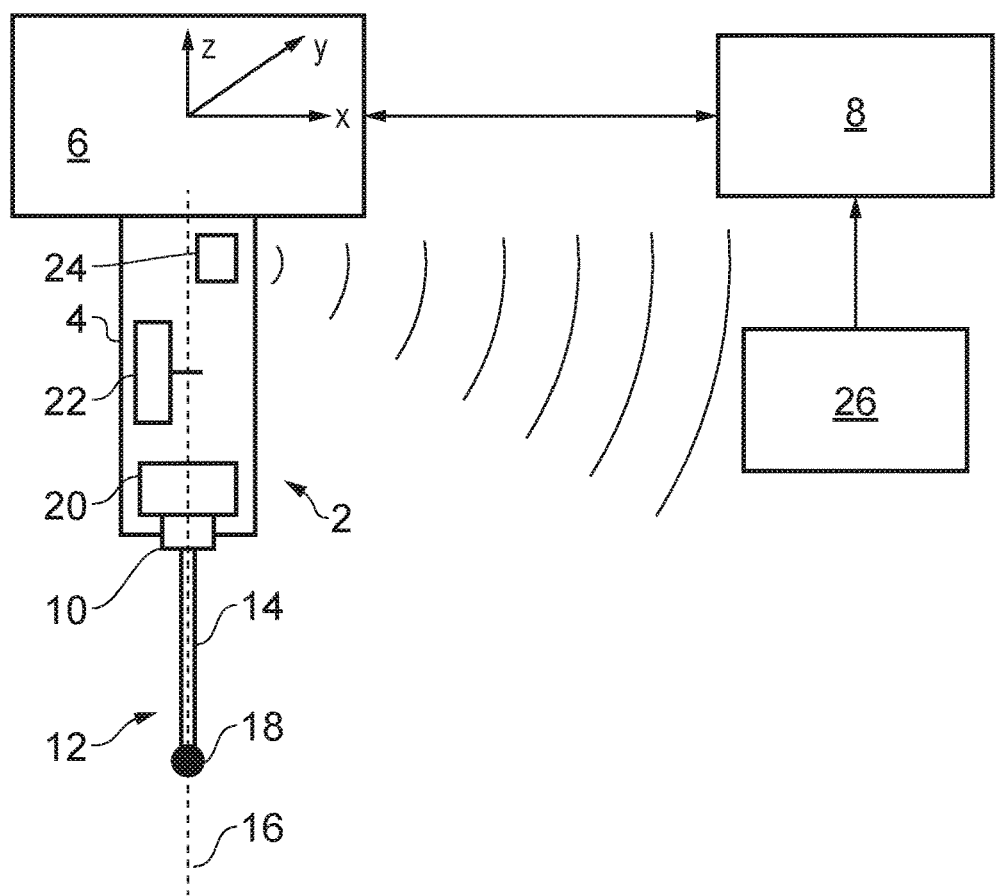

analyser only issues a trigger signal when the resultant deflection signal crosses the deflection threshold and no oscillatory motion of the stylus is detected. The measurement probe may be used on a machine tool or other coordinate positioning apparatus.

15 Claims, 6 Drawing Sheets

(56) References Cited

U.S. PATENT DOCUMENTS

| | | | |
|---|---|---|---|
| 5,329,808 A | 7/1994 | Elings et al. | |
| 6,487,785 B1 | 12/2002 | Ritz | |
| 7,385,410 B2 | 6/2008 | Payman | |
| 7,603,789 B2 | 10/2009 | Hellier et al. | |
| 7,689,379 B2* | 3/2010 | Fuge | G01B 7/012 33/561 |
| 7,779,553 B2* | 8/2010 | Jordil | G01B 3/008 33/558 |
| 7,792,654 B2 | 9/2010 | Prestidge et al. | |
| 7,814,779 B2* | 10/2010 | Igasaki | G01B 7/008 73/105 |
| 8,650,660 B2* | 2/2014 | Shi | G01Q 20/04 850/7 |
| 9,046,335 B2 | 6/2015 | Fuchs et al. | |
| 9,733,060 B2* | 8/2017 | Ould | G01B 7/012 |
| 9,835,433 B1* | 12/2017 | Antreasyan | G01B 7/012 |
| 2003/0101609 A1 | 6/2003 | Jordil et al. | |
| 2007/0063141 A1 | 3/2007 | Duerig et al. | |
| 2007/0068024 A1 | 3/2007 | Fuge et al. | |
| 2009/0025243 A1 | 1/2009 | Prestidge et al. | |
| 2009/0320553 A1 | 12/2009 | Weston et al. | |
| 2010/0018069 A1 | 1/2010 | Ould et al. | |
| 2013/0090878 A1 | 4/2013 | Somerville | |
| 2015/0301179 A1 | 10/2015 | Christen et al. | |
| 2018/0052186 A1* | 2/2018 | Su | G01Q 60/32 |

FOREIGN PATENT DOCUMENTS

| | | |
|---|---|---|
| CN | 1771425 A | 5/2006 |
| CN | 1928488 A | 3/2007 |
| CN | 101142461 A | 3/2008 |
| CN | 101171493 A | 4/2008 |
| CN | 101354266 A | 1/2009 |
| CN | 101438130 A | 5/2009 |
| CN | 101970979 A | 2/2011 |
| CN | 102947671 A | 2/2013 |
| CN | 103743318 A | 4/2014 |
| CN | 103822603 A | 5/2014 |
| CN | 104769454 A | 7/2015 |
| EP | 1061328 A2 | 12/2000 |
| EP | 2028439 A1 | 2/2009 |
| JP | 2013-533970 A | 8/2013 |
| WO | 2009/112819 A2 | 9/2009 |

OTHER PUBLICATIONS

Nov. 27, 2018 International Search Report issued in International Patent Application No. PCT/GB2018/052729.

Nov. 27, 2018 Written Opinion of the International Searching Authority issued in International Patent Application No. PCT/GB2018/052729.

* cited by examiner

MEASUREMENT PROBE APPARATUS AND METHOD

The present invention relates to measurement probe apparatus for use with coordinate positioning apparatus, such as machines tools, co-ordinate measuring machines (CMMs) or other measuring apparatus, and in particular to a touch trigger measurement probe apparatus that is less susceptible to the issuance of false triggers.

Touch trigger measurement probes for mounting in the spindle of machine tools are known. A typical touch trigger measurement probe comprises a workpiece-contacting stylus that can be deflected relative to the body or housing of the probe. One or more sensors are provided to measure deflection of the stylus relative to the probe body and a so-called "trigger signal" is issued by the probe to indicate the stylus has made contact with an object. This trigger signal is fed to the machine tool controller which takes a reading of the position of the machine tool spindle at the instant the trigger signal is received. This allows the co-ordinates of a point on the surface of the object to be measured. Touch trigger probes for dedicated CMMs are also known.

Examples of strain gauge based touch trigger probes are described in U.S. Pat. No. 7,792,654 and U.S. Pat. No. 7,603,789. Such probes comprise a workpiece-contacting stylus that is attached to the probe body via a sensor mechanism that comprises three strain gauge elements. The signals from the three strain gauge elements are passed to a processor which combines and analyses those signals and produces a trigger signal whenever the deflection of the workpiece-contacting stylus exceeds a predetermined deflection threshold or limit.

The OMP600 machine tool probing product produced by Renishaw plc, Wotton-Under-Edge, Glos., UK uses the technique described in U.S. Pat. No. 7,792,654 to produce a resultant stylus deflection signal from three strain gauge sensor signals. To help prevent false triggering, a so-called filter delay is also used so that a trigger signal is only issued by the probe when the resultant stylus deflection signal continuously exceeds the deflection threshold for a predetermined amount of time. Introducing such a filter delay (i.e. implementing a "trigger filter") can reduce false triggering by ensuring that any transient deflections (e.g. from machine vibrations) do not result in the issuance of a trigger signal.

It has, however, been found by the present inventor that even when using a filter delay it is possible for a false trigger to be issued as a result of certain free-space oscillatory motions of the probe's stylus that can, for example, be induced by machine vibration. For example, a carriage of a machine tool that is being driven along a linear axis by a lead screw may generate vibrations of a frequency that can induce oscillatory (e.g. resonant) motions of the probe stylus. Although events that cause sufficiently sustained oscillatory motion to defeat known trigger filters are typically rare, they can still lead to false triggers being issued by the probe. This has been found to be especially the case on lower specification and/or higher speed machine tools where higher levels of vibration may occur. The use of longer and/or heavier styli has also been found to exacerbate such effects.

According to a first aspect of the present invention there is provided a measurement probe apparatus, comprising;
a probe body,
a stylus that is deflectable relative to the probe body,
one or more sensor elements for sensing deflection of the stylus relative to the probe body and generating sensor signals indicative of stylus deflection, and
an analyser for analysing the sensor signals, the analyser being arranged to combine a plurality of the sensor signals to generate a resultant deflection signal for comparison to a deflection threshold,
characterised in that the analyser is also arranged to detect oscillatory motion of the stylus by analysing one or more of the sensor signals, whereby stylus contact with an object can be determined from the resultant deflection signal crossing the deflection threshold and no oscillatory motion of the stylus being detected from the analysis of the one or more sensor signals.

The present invention thus provides a measurement probe apparatus having an object-contacting stylus that is deflectable relative to a probe body. One or more sensor elements (e.g. strain gauge sensors) are provided for sensing deflection of the stylus (e.g. in different directions) and generating sensor signals indicative of stylus deflection. As described below, the apparatus may comprise a plurality of sensor elements that each generate one sensor signal. For example, each sensor signal may comprise an analogue signal having a voltage that varies in relation to the amount of stylus deflection sensed by the relevant sensor element. An analyser (which may form part of a trigger unit as described below) is also provided for analysing the sensor signals and issuing a trigger signal to indicate the stylus has contacted an object. As explained below, the analyser may comprise one or more processors and other associated electronic components etc for digitising, processing and analysing the sensor signals.

The analyser is arranged to combine a plurality of the sensor signals to generate a resultant deflection signal for comparison to a deflection threshold. For example, the analyser may generate the resultant deflection signal using a modified sum-of-squares signal combination technique of the type described in U.S. Pat. No. 7,792,654. The analyser is also arranged to detect oscillatory motion of the stylus by analysing at least one of the sensor signals. A variety of techniques that can be used for such an analysis are described in more detail below. The analyser thus not only generates a resultant deflection signal for comparison to a deflection threshold but it also separately analyses some, or all, of the sensor signals to ascertain if the stylus is undergoing oscillatory motion (e.g. free-space, resonant motion). It may then be determined that stylus contact with an object has occurred when both (a) the resultant deflection signal has crossed the deflection threshold and (b) there is no oscillatory motion of the stylus detected. In other words, indicating contact with an object has been made (e.g. by the issuance of a trigger signal by a trigger unit as described below) is suppressed if the resultant deflection signal crosses the deflection threshold but oscillatory motion of the stylus is detected by the separate (e.g. individual) analysis of the sensor signals.

A measurement probe in accordance with the present invention thus has improved resilience to false triggers compared with prior art measurement probes of the type described above, especially in high vibration environments. This arises from the present inventors recognising that external vibrations (e.g. arising from a machine tool or CMM on which the probe is mounted) can, in certain circumstances, generate oscillatory stylus motion. This oscillatory stylus motion may be around a circular or elliptical path or it may be a more complex, higher order, harmonic motion. This motion can generate a resultant deflection signal that exceeds the trigger threshold for a sustained period of time and would thus be falsely identified by prior art measurement probes as a surface contact event (e.g. for which a trigger signal is issued). The separate analysis of each of the sensor signals allows such oscillatory motion of the stylus to be detected and, for example, the issuance of a trigger signal to be suppressed when such oscillatory stylus motion is found to be present.

Advantageously, the apparatus comprises a trigger unit comprising the above described analyser. The trigger unit is preferably arranged to issue a trigger signal to indicate the stylus has made contact with the object. The trigger unit conveniently only issues the trigger signal when the resultant deflection signal crosses the deflection threshold and no oscillatory motion of the stylus is detected from the analysis of the one or more sensor signals. In other words, the processing necessary to determine when the resultant deflection signal has crossed the deflection threshold and the analysis that detects any oscillatory stylus motion is performed in the trigger unit of the apparatus. The trigger unit may form a part of the measurement probe itself (e.g. it may be contained within the probe body) or it may be distributed across the measurement probe and an associated probe interface. In use, any trigger signal generated by the trigger unit can be passed to the associated coordinate positioning apparatus (e.g. machine tool) on which the measurement probe is mounted to indicate the stylus has made contact with an object. In this manner, the apparatus can be installed on a coordinate positioning apparatus (e.g. machine tool) that has only a single SKIP input and can thus be a direct replacement for prior art probing apparatus (i.e. without any need to modify the coordinate positioning apparatus).

Advantageously, the trigger unit applies a trigger filter such that the trigger signal is issued a predetermined time interval after the resultant deflection signal crosses the deflection threshold. In other words, a trigger filter may be applied by the trigger unit such that a trigger signal is only issued if the resultant deflection signal remains above the deflection threshold for a filter delay period (i.e. the predetermined time interval). This applied trigger filter may comprise the basic trigger filter that is described in more detail with reference to FIG. 1 below. The trigger filter may also identify and ignore certain transient dips in the resultant deflection signal below the threshold during the filter delay period. In other words, the trigger unit may implement the modified trigger filter that is described in more detail with reference to FIG. 1 below. It should also be noted that any suitable trigger filter may be applied by the trigger unit to the analysis of the resultant trigger signal.

Advantageously, the trigger unit is arranged to detect oscillatory motion of the stylus by analysing said at least one of the sensor signals during the predetermined time interval (i.e. of the trigger filter). The trigger unit is configured to only issue the trigger signal if no oscillatory motion of the stylus is detected during the predetermined time interval. In other words, the trigger unit may perform the analysis of the sensor signal to ascertain if there is oscillatory motion of the stylus during the filter delay period. In this manner, the trigger signal issuance that would otherwise occur at the end of the filter delay period (if the trigger filter did not itself reject the event) can be prevented if oscillatory motion of the stylus is detected. Preferably the predetermined time interval (i.e. filter delay) is set to be longer than the time required to identify the oscillatory motion of the stylus from the analysis of the sensor signals. This may, for example, be based on an estimate of the lowest oscillation frequency likely to adopted by the stylus or any other styli that may be used with the measurement probe. The predetermined time interval may be adjustable. In particular, the predetermined time interval may be adjusted for different styli to ensure there is enough time for the trigger unit to perform the required analysis of the sensor signal within the filter delay period.

The trigger unit and a communications module may be located within the probe body. Advantageously, the communications module is configured to transmit the trigger signal generated by the trigger unit to an associated probe interface. The measurement probe may have a hardwired link to an interface or machine tool controller for communicating the trigger signal. Advantageously, the measurement probe may comprise a wireless communications module (e.g. an RF or optical link) for transmitting the trigger signal to an associated (e.g. remote) probe interface. The associated probe interface may, in turn, be connected to the controller (e.g. numerical controller) of the coordinate positioning apparatus to which the measurement probe apparatus is mounted. The probe may be battery operated and may be configured for mounting to a suitable coordinate positioning apparatus (e.g. a coordinate measuring machine, machine tool, flexible gauge, robot or the like). Advantageously, the measurement probe may include a shank for attachment to the spindle of a machine tool.

In an alternative embodiment, the analyser of the measurement probe apparatus is configured to issue a preliminary trigger signal when the resultant deflection signal crosses the deflection threshold. The analyser also issues a trigger confirmation signal when no oscillatory motion of the stylus is detected from its analysis of the one or more sensor signals. The presence (or lack) of oscillatory motion may be assessed over a predetermined time period. In other words, the analyser may provide a first output describing the comparison of the resultant deflection signal to the threshold and a second output describing the result of the analysis performed to ascertain if oscillatory stylus motion is present. As explained below, this arrangement requires an analyser interface that can receive and process the two signals and is thus best suited to hardwired measurement systems on dedicated CMMs or the like where such additional inputs can be more easily provided during measurement probe integration.

The measurement probe apparatus may also include an analyser interface for receiving the preliminary trigger signal and the trigger confirmation signal from the analyser. The analyser interface may comprise a discrete interface unit or it may form a part of the controller of the coordinate positioning apparatus. The analyser interface preferably uses the preliminary trigger signal and trigger confirmation signal to determine whether stylus contact with an object has been made. In particular, the analyser interface may be programmed to determine there has been stylus contact with an object on receipt of the preliminary trigger signal and the subsequent receipt of the trigger confirmation signal. Conveniently, the preliminary trigger signal causes the coordinate positioning apparatus to record the position of the measurement probe in the machine environment (e.g. by capturing or "freezing" the encoder scales). The receipt of the trigger confirmation signal may then be used to confirm the recorded position should be treated as a measurement point on the object (and the absence of such a trigger confirmation signal means the recorded position information can be disregarded as a false trigger). In this manner, the measurement of surface positions can be based on the preliminary trigger signal but only if this is subsequently confirmed to relate to stylus contact with an object and not free-space oscillatory stylus motion.

The analyser may analyse only a single sensor signal to detect oscillatory motion of the stylus. Advantageously, the analyser analyses a plurality of the sensor signals to detect oscillatory motion of the stylus. In the embodiments described below that comprise three sensor elements, the analyser preferably analyses each of the three sensor signals generated by the three sensor elements to detect oscillatory motion of the stylus. Conveniently, the analysis performed by the analyser to detect oscillatory motion of the stylus comprises ascertaining if there is a periodic variation in the magnitude of each of the plurality of sensor signals. For example, any sinusoidal variation in each of the sensors signals may be detected. The relative phase between any such sinusoidal variations in each of the sensors signals may also be determined and used to indicate that free-space oscillatory motion of the stylus has occurred. For example, a constant phase shift between periodically varying sensor signals may be used to indicate the presence of oscillatory stylus motion.

Advantageously, the analysis performed by the analyser to detect oscillatory motion of the stylus comprises ascertaining if there is a periodic variation in the magnitude of each of the plurality of sensor signals about a sensor signal null level. The sensor signal null level is conveniently the sensor signal produced in the absence of an external deflecting force being applied to the stylus. In one embodiment, the sensor signal generated by each of multiple sensor elements may be "zeroed" when it is known that no external force (other than gravity) is being applied to the stylus. Such a zeroing process may be performed with the measurement probe placed in the orientation that will be used for subsequent measurements (i.e. so that the zero level describes the stylus position as influenced by gravity in that particular orientation). It would, of course, also be possible to define a null level to be an arbitrary value (i.e. other than zero) for each of multiple sensor elements and ascertain if the sensor signal of each sensor element crosses the null level of that sensor element. Any periodic variation in the magnitude of each of the plurality of sensor signals about the respective sensor signal null level (e.g. variations from negative to positive sensor signal values if the signal null level is set at zero) can be used to identify oscillatory stylus motion.

Advantageously, the analysis performed by the analyser to detect oscillatory motion of the stylus comprises determining whether each sensor signals crosses a threshold level within a pre-set time period. If multiple sensor elements are provided, the threshold level for each sensor element is conveniently set relative to the sensor signal null level for that sensor element. For example, each threshold level may advantageously be set at the sensor signal null level for that sensor element. For convenience, the sensor signal produced by each sensor element may be zeroed at the signal null level. Any zero crossings of the sensor signal may then be used to determine the threshold level has been crossed. In this manner, the analyser may identify the presence of oscillatory stylus motion if each of the sensor signals crossed its null level (e.g. zero level) within the pre-set time period. If a trigger filter is implemented as described above, the pre-set time period may be shorter than the filter delay. A simple and convenient way of assessing if there are periodic variations in the magnitude of each of the plurality of sensor signals is thus provided.

The analysis performed by the analyser to detect oscillatory motion of the stylus may comprise determining whether at least one of the plurality of sensor signals remains above or below a threshold level within a pre-set time period. It can then be ascertained that oscillatory motion is present if none of the plurality of sensor signals remain above or below the threshold level for the pre-set time period. In other words, if one or more of the sensor signals exceed a threshold and then remain above that threshold then it can be ascertained that there is no oscillatory stylus motion. Similarly, if one or more of the sensor signals drops below a threshold and then remains below that threshold it can be ascertained that there is no oscillatory stylus motion. In one embodiment, a preliminary trigger signal may be issued when the resultant deflection signal crosses the trigger threshold and a trigger confirmation signal issued when one or more of the plurality of sensor signals remain above or below a threshold level for a pre-set time period.

In a preferred embodiment, the measurement probe apparatus comprises a plurality of sensor elements. The measurement probe apparatus may comprise three or more sensor elements. Each sensor element may comprise a discrete sensing component. Advantageously, the apparatus comprises three sensor elements that generate three sensor signals (i.e. one sensor signal per sensor element). These three sensor signals may all be combined to provide the resultant deflection signal and each of the same three sensor signals may also be used to detect oscillatory motion of the stylus. The probe could, however, comprise fewer sensor elements (e.g. two sensor elements) or additional sensor elements (e.g. more than three sensor elements) as required. Each sensor element may comprise a single sensing component or it may be formed by a plurality of sensing sub-components that together provide a single sensor signal. The sensor elements may be arranged to sense stylus deflections in different directions to one another.

In an alternative embodiment, the apparatus may include a multi-dimensional sensor device (e.g. a 2-D Position Sensing Detector or PSD). The multi-dimensional sensor device may include a plurality of sensing elements that generate the plurality of sensor signals. Alternatively, a PSD may be provided (e.g. a 2-D tetra-lateral PSD) in which two sensor signals are generated that describe the 2-D position of a light spot incident on a single active area of a sensor element. It can thus be seen that a one-to-one correspondence between the number of sensor elements and the number of sensor signals is not essential. A single sensor element may generate a plurality of sensor signal or multiple sensor elements may generate a single sensor signal. The skilled person would fully appreciate the various different sensor configurations that would allow stylus deflection to be measured.

Only some of the sensor signals (i.e. a first subset of sensor signals) produced by the one or more sensor elements may be used by the analyser to generate the resultant deflection signal. Preferably, the sensor signals from all of the sensor elements are combined to form the resultant deflection signal. The resultant deflection signal may be generated from the sensor signals using a variety of known combination techniques. For example, a first past the post (FPTP), sum-of-squares (SOS), rectified and summed (RAS) or a modified sum-of-squares (MSOS) technique may be used. Advantageously, the modified sum-of-squares technique described in U.S. Pat. No. 7,792,654 may be used to generate the resultant deflection signal. Such a technique is especially advantageous as it reduces direction dependent variations in the amount of stylus deflection required to generate a trigger signal.

The analyser may be arranged to detect oscillatory motion of the stylus by analysing only some of the sensor signals (i.e. a second subset of sensor signals) produced by the plurality of sensor elements. The sensor signals used to detect oscillatory motion of the stylus may thus be different to those used to generate the resultant deflection signal. It is thus possible to provide a first subset of sensor signals to generate the resultant deflection signal and a second subset of sensor signals to detect oscillatory motion of the stylus. The first and second subsets may be mutually exclusive subsets (i.e. separate sensor elements may be provided to generate the resultant deflection signal and to detect oscillatory motion of the stylus). Preferably, the first and second subsets overlap; i.e. one or more sensor signals may be included in both the first and second subsets. Advantageously, the analyser is arranged to detect oscillatory motion of the stylus by analysing the sensor signals from all of the sensor elements.

The sensor elements may comprise any suitable sensor elements for measuring stylus deflection. Preferable, each of the one or more sensors elements are of the same type. The one or more sensor elements may comprise piezo-electric sensor elements. The one or more sensor elements may comprise capacitive sensor elements. The one or more sensor elements may comprise optical sensor elements. The one or more sensor elements preferably comprises a plurality of strain gauge sensor elements. In particular, the one or more sensor elements may comprise a plurality of strain gauge sensor elements (e.g. a plurality of discrete strain gauge sensor elements). As mentioned above, any suitable number of strain gauge sensor elements may be provided. For example, the plurality of strain gauge sensor elements may conveniently comprise three strain gauge sensor elements. These three strain gauge sensor elements may be equidistantly spaced apart from each other around the stylus. The strain gauge arrangement described in U.S. Pat. No. 7,603,789 may be advantageously provided.

The measurement probe apparatus may comprise a stylus holder for retaining the stylus. The stylus may be formed integrally with the stylus holder. Advantageously, the stylus may be releasably attached to the stylus holder (e.g. using a screw thread attachment, stylus plate or the like). As explained above, the measurement probe apparatus may have a hardwired link to an interface or machine tool controller for communicating the trigger signal. Alternatively, the measurement probe may comprise a wireless communications module (e.g. an RF or optical link) for transmitting the trigger signal to a remote probe interface.

According to a second aspect of the present invention, there is provided a method of measuring contact with an object using a measurement probe apparatus comprising a probe body, a stylus that is deflectable relative to the probe body, and one or more sensors for sensing deflection of the stylus relative to the probe body and generating a plurality of sensor signals, the method comprising the steps of;
  (i) combining at least two of the plurality of sensor signals to generate a resultant deflection signal, and
  (ii) comparing the resultant deflection signal generated in step (i) to a deflection threshold,
  characterised by the steps of;
  (iii) analysing at least one of the plurality of sensor signals to detect oscillatory motion of the stylus, and
  (iv) indicating the stylus has contacted an object only if step (ii) indicates the resultant deflection signal has exceeded the deflection threshold and step (iii) does not detect oscillatory motion of the stylus. The method may include any of the features described above in connection with the analogous apparatus.

Also described herein is a method of measuring contact with an object using a measurement probe comprising a probe body, a stylus that is deflectable relative to the probe body, and a plurality of sensors for sensing deflection of the stylus, the plurality of sensors generating a plurality of sensor signals, the method comprising the steps of; (i) combining at least two of the plurality of sensor signals to generate a resultant deflection signal, and (ii) comparing the resultant deflection signal generated in step (i) to a deflection threshold, characterised by the steps of; (iii) analysing at least one of the plurality of sensor signals to detect oscillatory motion of the stylus, and (iv) issuing a trigger signal to indicate the stylus has contacted an object only if step (ii) indicates the resultant deflection signal has exceeded the deflection threshold and step (iii) does not detect oscillatory motion (e.g. free-space, oscillatory motion) of the stylus. The method may include any of the features described above in connection with the analogous apparatus.

Also described herein is a measurement probe comprising a probe body, a stylus that is deflectable relative to the probe body, and a plurality of sensors for sensing deflection of the stylus. The plurality of sensors generating a plurality of sensor signals and a stylus oscillation detection unit being provided for analysing at least one of the plurality of sensor signals to detect free-space oscillatory motion of the stylus. Such a measurement probe may include one or more of the other features described herein.

Also described herein is a measurement probe, comprising; a probe body, a stylus that is deflectable relative to the probe body, a plurality of sensor elements for sensing deflection of the stylus, each sensor element generating a sensor signal indicative of stylus deflection, and a trigger unit for analysing the sensor signals and issuing a trigger signal to indicate the stylus has contacted an object, the trigger unit being arranged to combine a plurality of the sensor signals to generate a resultant deflection signal for comparison to a deflection threshold. The trigger unit may also be arranged to detect oscillatory motion of the stylus by analysing at least one of the sensor signals, wherein the trigger unit only issues the trigger signal when the resultant deflection signal crosses the deflection threshold and no oscillatory motion of the stylus is detected. Such a measurement probe may include one or more of the other features described herein.

Figure 2A:
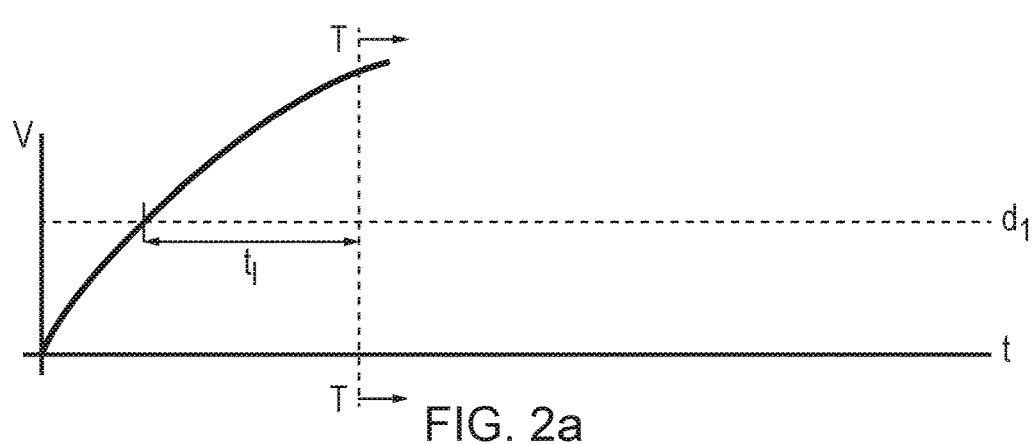
Figure 2B:
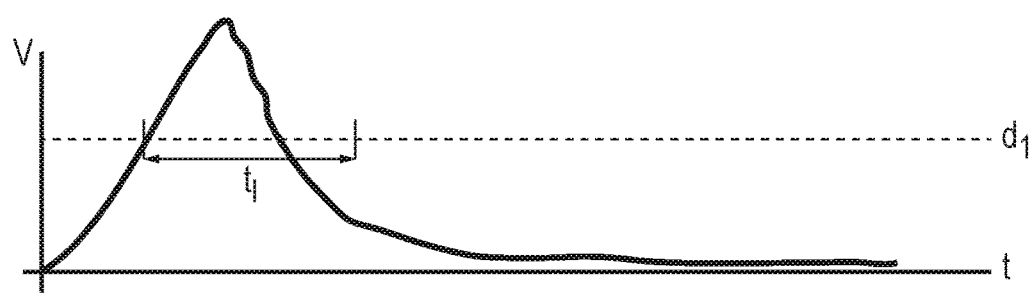
Figure 3:
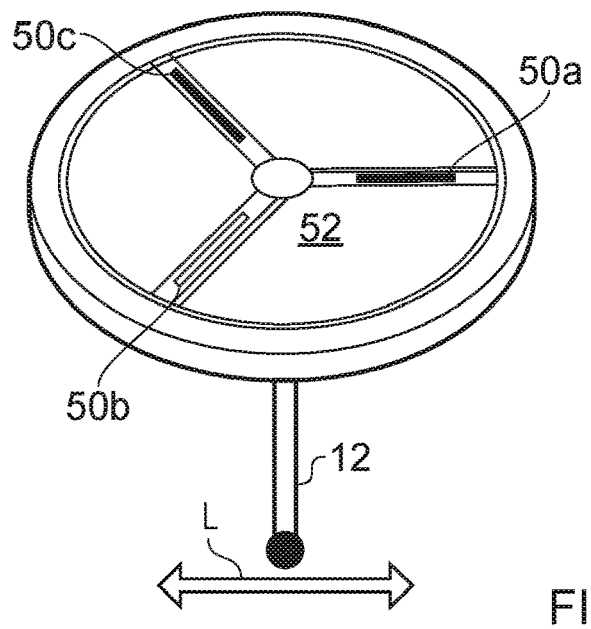
Figure 4:
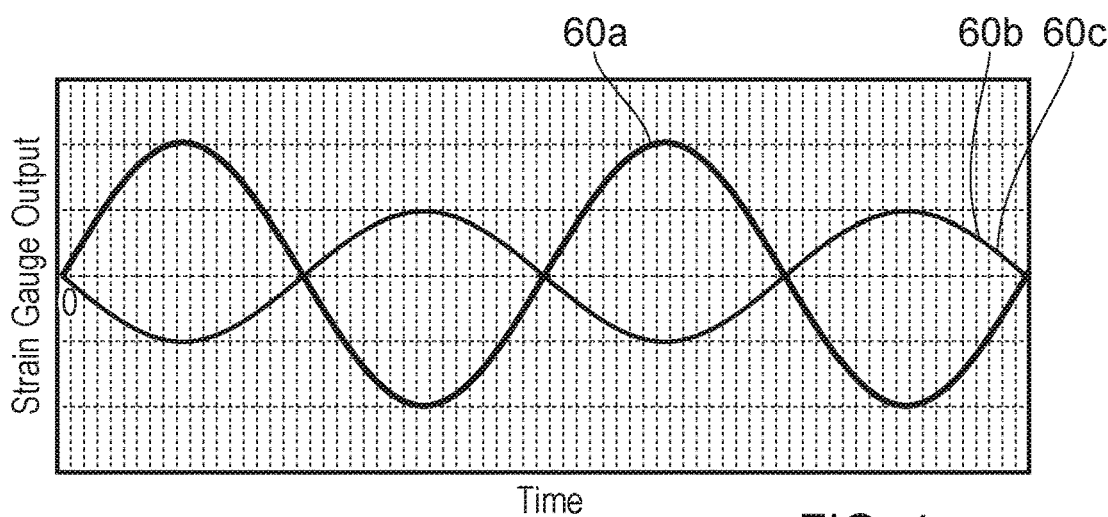
Figure 5:
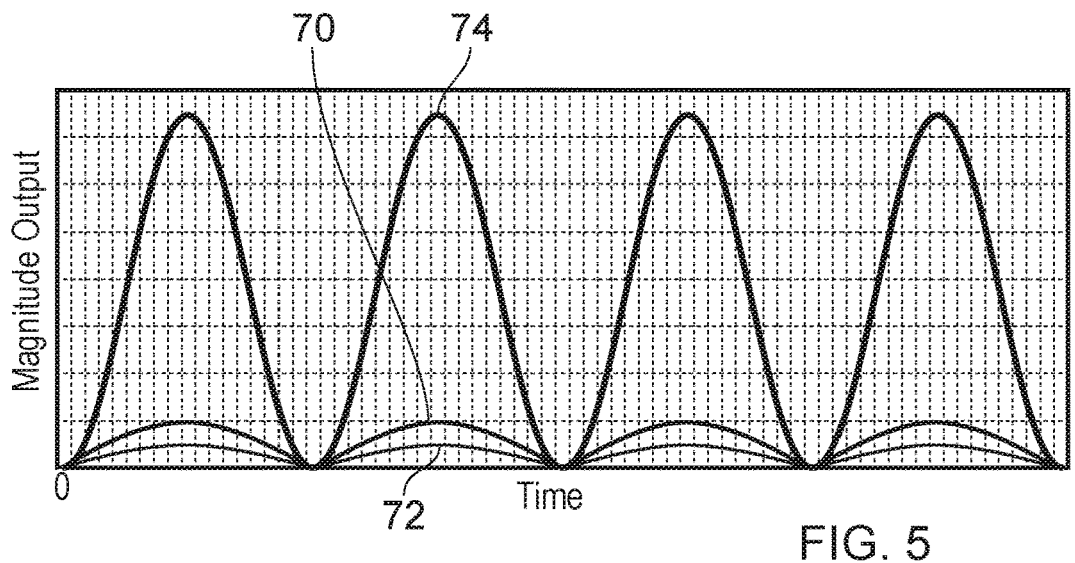
Figure 6:
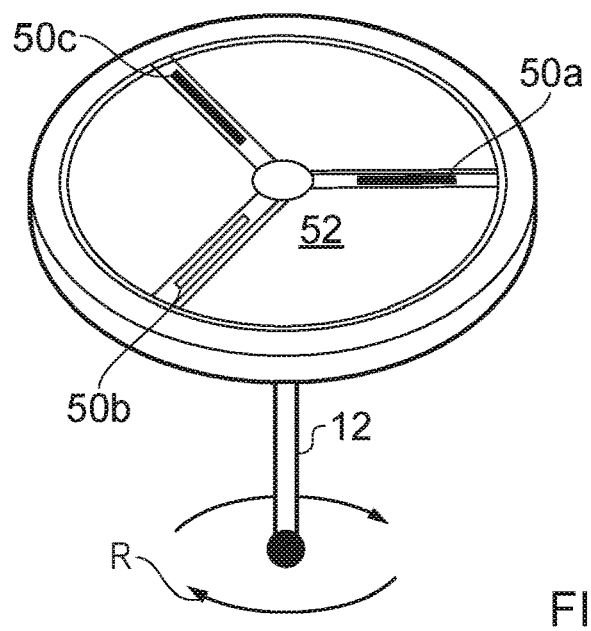
Figure 7:
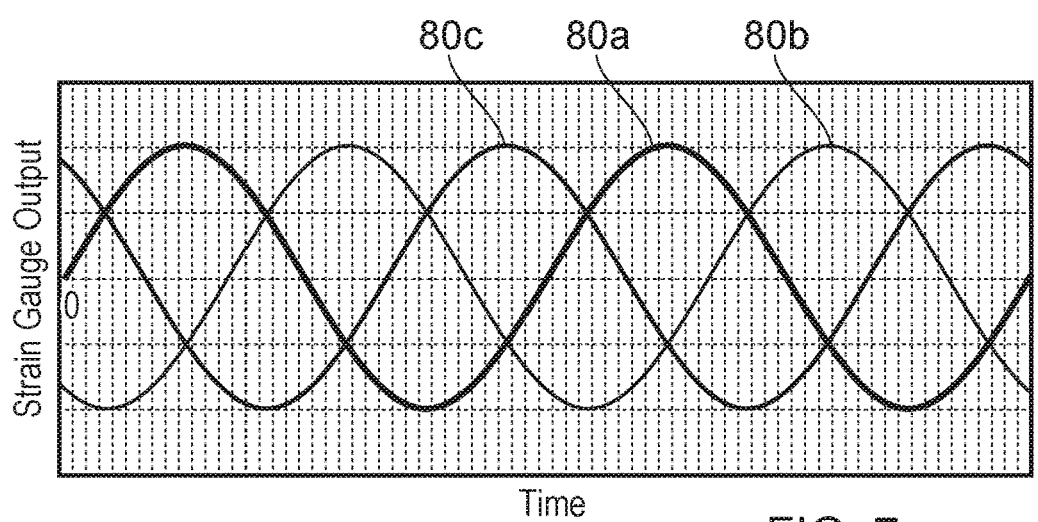
Figure 8:
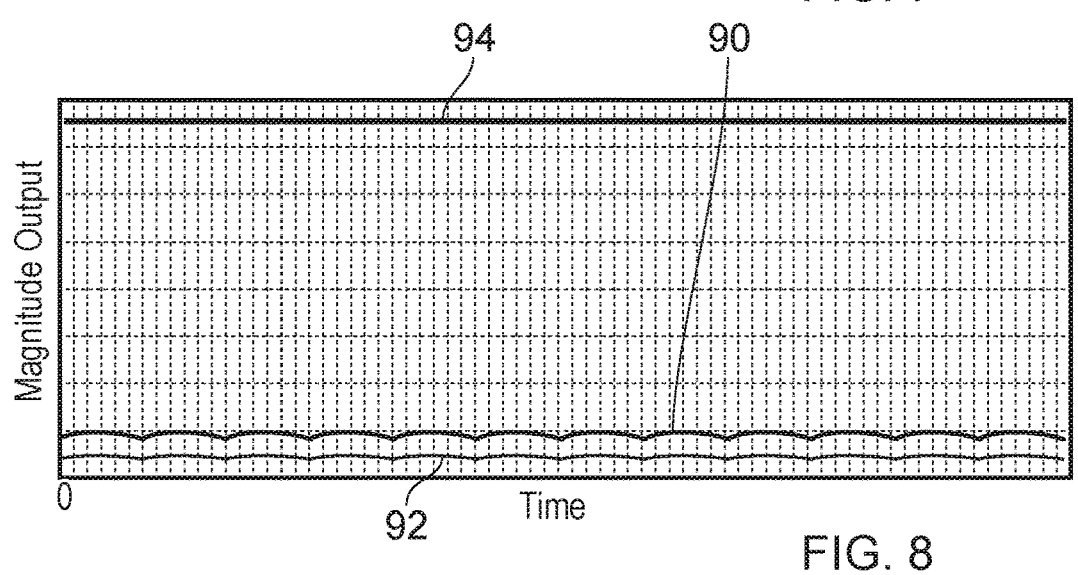
Figure 9:
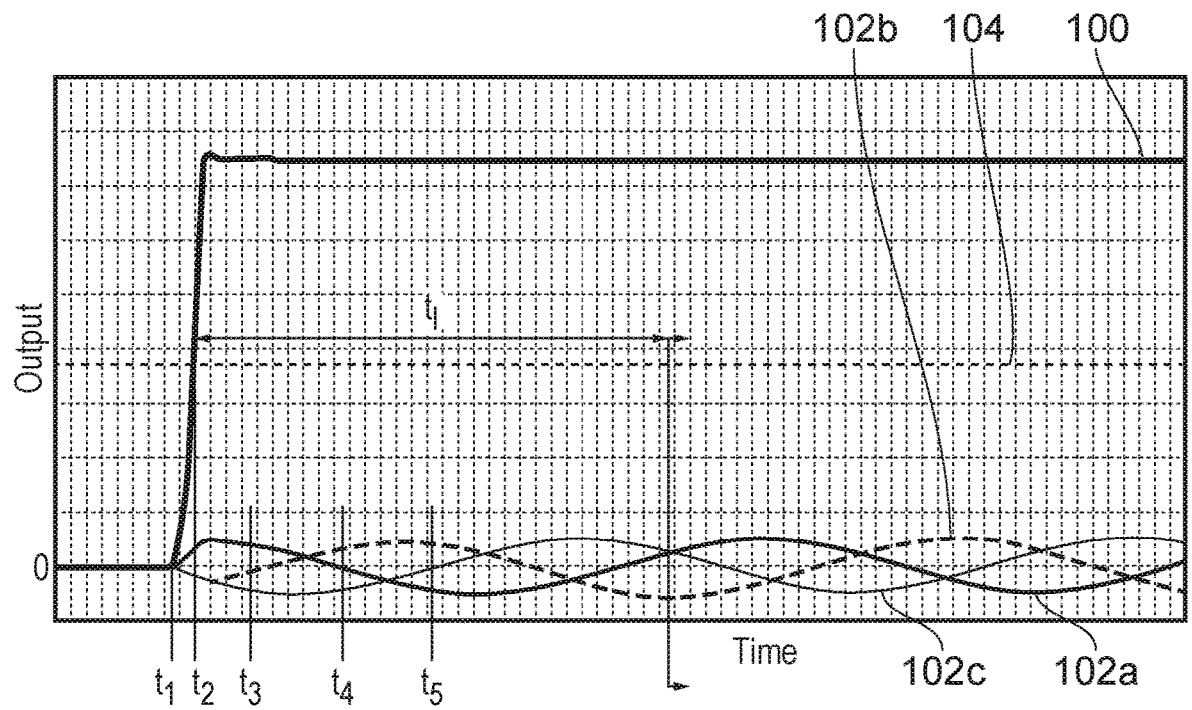
Figure 10:
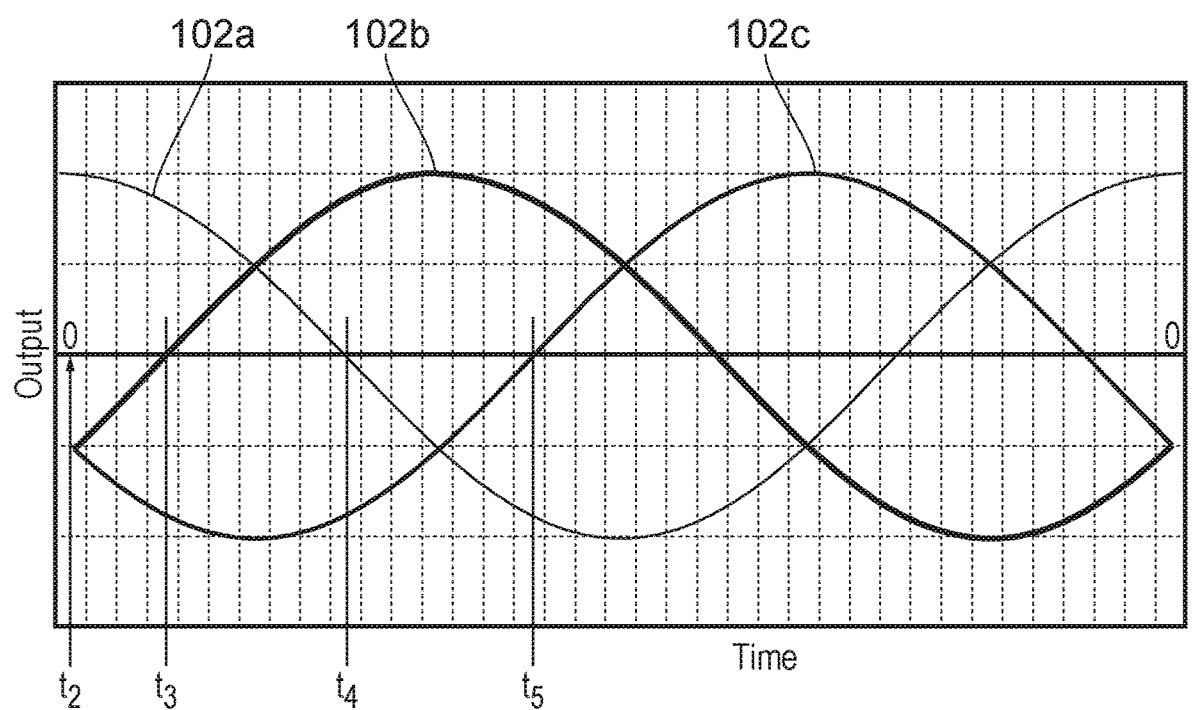
Figure 11:
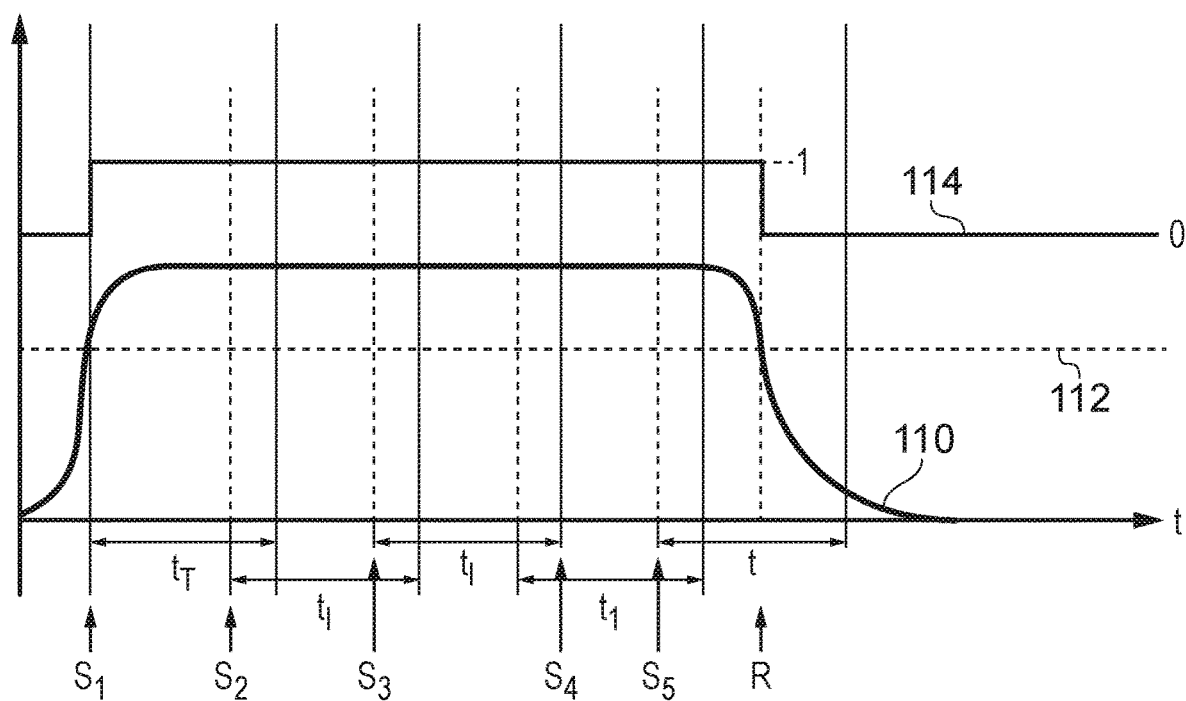
Figure 12:
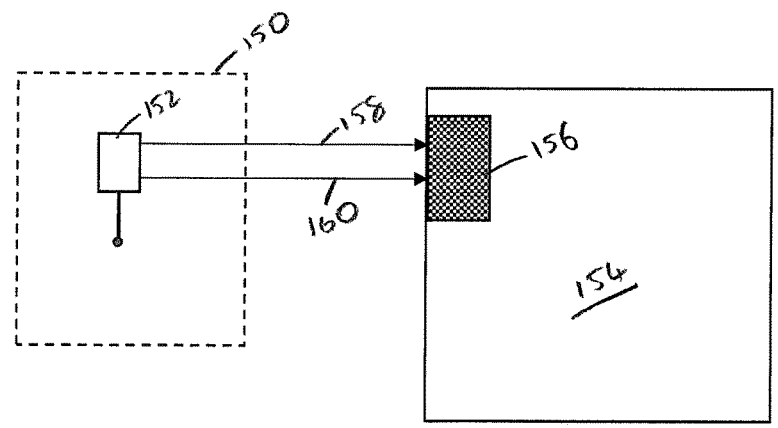
Figure 13:
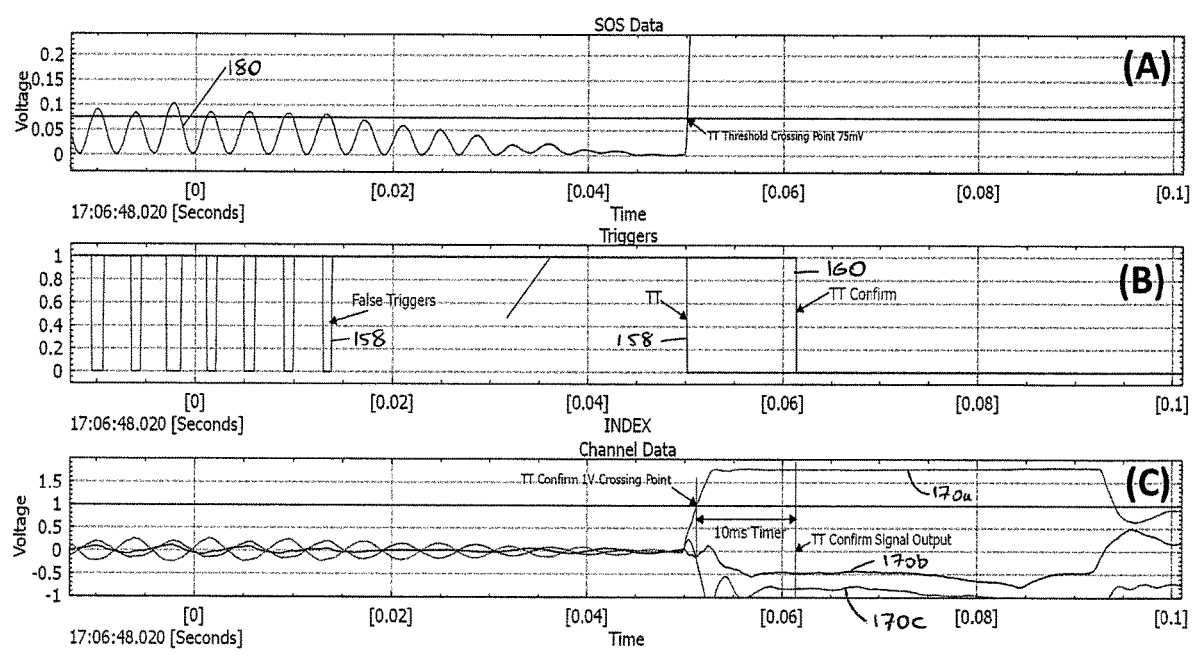

The invention will now be described, by way of example only, with reference to the accompanying drawings in which;

FIG. 1 illustrates a measurement probe of the present invention,

FIGS. 2a to 2b illustrate a resultant deflection signals relative to a trigger threshold, FIG. 3 illustrates a strain gauge probe undergoing linear stylus oscillation, FIG. 4 shows the strain gauge signals generated by the probe of FIG. 3, FIG. 5 shows the resultant deflection signals that can be generated from the strain gauge signals shown in FIG. 4, FIG. 6 illustrates a strain gauge probe undergoing circular stylus oscillation, FIG. 7 shows the strain gauge signals generated by the probe of FIG. 6, FIG. 8 shows the resultant deflection signals that can be generated from the strain gauge signals shown in FIG. 7, FIG. 9 shows the concept of identifying zero-crossings in the filter delay period, FIG. 10 is an expanded view of the zero-crossing of FIG. 9, FIG. 11 shows the repeated resetting of the trigger filter in the presence of the circular stylus oscillation, FIG. 12 shows an alternative arrangement for interfacing a touch trigger probe to a coordinate positioning apparatus, and FIG. 13 shows the various signals generated in the embodiment of FIG. 12.

Referring to FIG. 1, a touch trigger measurement probe 2 is illustrated having a probe housing or body 4 releasably attached to the rotatable spindle 6 of a machine tool. The spindle 6 is attached to a machine head (not shown) that can be moved about the machine envelope along three mutually orthogonal (x,y,z) axes. Movement of the spindle is controlled by a computer numerical controller 8. The position of the spindle 6 is also measured by position encoders (not shown) and such positional information is provided to the CNC 8.

The measurement probe 2 has a stylus holder 10 to which a stylus 12 is attached by a screw thread connection. The stylus 12 comprises a stem 14 that extends along a longitudinal axis 16 and is terminated by a stylus tip or ball 18 for contacting an object (e.g. a workpiece or calibration artefact) mounted to the bed of the machine tool.

The stylus holder 10 is connected to the probe housing 4 via a strain sensor 20. In this example, the strain sensor 20 comprises three fairly rigid, radially spaced, spokes each having a strain gauge elements attached thereto for sensing the strain in each spoke. The sensed strain thus provides an indication of the force with which the stylus 12 is being deflected relative to the probe body 4. More details about the strain sensor arrangement can be found elsewhere; for example, see U.S. Pat. No. 7,792,654 and U.S. Pat. No. 7,603,789, the contents of which are hereby incorporated herein by reference.

The probe 2 also comprises a trigger unit 22 (the trigger unit being an example of an analyser) in the form of a processor that receives the outputs of the strain sensor 20. In particular, the trigger unit 22 receives the three outputs of the three strain gauges in the form of varying voltage signals caused by resistance changes induced by the applied strain. The trigger unit 22 is arranged to combine the three strain gauge signals received from the strain sensor 20 using the sum-of-squares technique described in U.S. Pat. No. 7,792,654 in order to produce a resultant deflection signal which is compared to a trigger threshold. In particular, the trigger unit 22 is arranged to assess when the resultant stylus deflection signal has continuously exceeded a deflection threshold for a certain period of time (commonly termed the filter delay period or filter delay).

In a prior art touch trigger measurement probe 2, the trigger unit 22 would issue the trigger signal when the resultant deflection signal exceeded the trigger threshold for the filter delay period; this is termed a basic trigger filter herein. The prior art OMP600 measurement probe mentioned above also comprises a slight variant to the basic trigger filter, which is herein termed the modified trigger filter. The modified trigger filter ignores any transient dips in the resultant deflection signal below the trigger threshold during the filter delay period, but only if at least one of the three strain gauge signals remains above an upper limit during the filter delay period. This modified trigger filter allows any transient vibrations effects that cause the resultant deflection signal to drop below the trigger threshold to be ignored. Such a modified trigger filter may optionally be implemented by the trigger unit 22, but for ease of description only the basic trigger filter will be described below.

In addition to generating a resultant deflection signal for comparison to a trigger threshold and in accordance with the present invention, the trigger unit 22 also analyses each of the three strain gauge signals separately to ascertain if the variation in such signals is indicative of oscillatory (e.g. rotary) motion of the stylus. More details of the analysis that is performed, and why such an analysis is advantageous, is outlined below.

The probe 2 also comprises a wireless (RF) communications module 24 that communicates the trigger signal to a remote probe interface 26 over a RF link in a known manner. The trigger signal may then be passed to the NC 8 by the interface 26. In this manner, the co-ordinate position of the spindle within the machine envelope can be found whenever a trigger signal is issued by the measurement probe thereby allowing co-ordinate position data to be established for points on the surface of an object.

Referring to FIGS. 2a and 2b, the operation of the basic trigger filter implemented by the trigger unit 22 during the measurement of a point on the surface of an object will be described. In particular, FIGS. 2a and 2b illustrate how the trigger unit 22 issues a trigger signal (T) when the resultant deflection signal (i.e. expressed in FIGS. 2a and 2b as a voltage V) continuously exceeds a deflection threshold d1 for a time period L.

FIG. 2a illustrates the resultant deflection (voltage) signal derived from the strain sensor 20 of the measurement probe as the stylus is brought into contact with a point on the surface of an object. It can be seen that the deflection increases as the stylus tip is driven into the surface. After initial contact, the deflection threshold is breached and the deflection remains above that threshold for time $t_1$ whereupon a trigger signal (T) is issued and probe movement is halted. It should be noted that, in reality, surface bounce and other effects may cause a slight deviation from the shape of the curve that is shown in FIG. 2a. Such deviations are especially likely in the time period shortly after initial surface contact is made.

As can be seen in FIG. 2b, the use of the basic trigger filter can prevent some instances of false triggering that would otherwise occur when the probe is moved around the machine tool between measurements. In particular, FIG. 2b shows the transient increase in stylus deflection as the measurement probe is accelerated from a first speed (e.g. zero) to a second speed (e.g. the speed used to move the probe into the vicinity of the workpiece from a safety plane). Although the deflection briefly exceeds the d1 deflection threshold, it only does so for a short period of time. As the deflection limit d1 is not exceeded for more than the filter delay ti there is no (false) trigger signal issued in this instance. A similar transient crossing of the deflection threshold may occur in the presence of vibrations or mechanical shocks to the probe.

Referring next to FIGS. 3, 4 and 5, the various signals derived from the strain gauge elements of the measurement probe in the presence of a linear stylus motion will be described.

FIG. 3 is a schematic illustration of the strain sensor 20 of the measurement probe described above. The strain sensor 20 comprises three strain gauge elements 50a, 50b and 50c (spaced 120° apart from one another) mounted on a strain gauge supporting structure 52. The supporting structure 52 is strained by a force applied to it by the stylus 12 and this is strain is detected by the three strain gauge elements 50a, 50b and 50c. The three strain gauge elements 50a, 50b and 50c thus each generate strain gauge signals having a magnitude related to the magnitude of deflection of the stylus 12.

FIG. 4 illustrates the output strain gauge signals 60a, 60b and 60c from the three strain gauge elements 50a, 50b and 50c respectively when there is linear stylus tip motion back and forth along the direction L shown in FIG. 3. It can be seen that the strain gauge signal 60a (which is generated by the strain gauge elements 50a aligned with the motion direction L) varies periodically as the stylus moves back and forth in free space. The other strain gauge signals 60b and 60c (which overlay each other in FIG. 4) vary with the same periodicity, but are phase shifted relative to the strain gauge signal 60a.

A variety of techniques are known for combining the strain gauge signals 60a, 60b and 60c to form a resultant deflection signal. The aim of such techniques is to minimise any direction dependent variations in the amount of stylus deflection required to generate a trigger signal. This allows end users to calibrate the measurement probe in a single direction, but for that calibration to be valid in all probing directions. Techniques previously used to combine the strain gauge signals to form a resultant deflection signal include First Past The Post (FPTP), Sum Of Squares (SOS), Modified Sum Of Squares (MSOS) and Rectified And Summed (RAS). The MSOS technique may be as described in U.S. Pat. No. 7,792,654, which has been found to be particularly good at reducing direction dependent variations in the amount of stylus deflection required to generate a trigger signal.

FIG. 5 illustrates a first resultant deflection signal 70 generated by the RAS technique. A second resultant deflection signal 72 is shown that is generated using the FPTP method. A third resultant deflection signal 74 is shown that is generated using the MSOS technique. It can be seen from FIG. 5 that all the techniques have peaks in the resultant signal that may cross a threshold and (falsely) indicate the stylus has contacted the surface. The peaks in the third resultant deflection signal 74 generated by the MSOS technique are, however, very likely to exceed any threshold that is set to capture surface contact. In this simple example, the basic trigger filter described above will prevent false triggers from being issued (provided the filter delay is longer than the repetition period of the resultant deflection signal).

The assumption that all unwanted "False Triggers" are caused by linear accelerations of the probe has been found by the present inventor to provide an incomplete picture. Analysis of measurement probes operating in real world scenarios has shown that the measurement probe and stylus combinations can sometimes be excited so as to oscillate at their resonant frequency by vibrations from the machine tool. This means that the stylus will start to oscillate at the free-space resonant frequency of the probe and stylus combination. In the scenario where the mass centre of the stylus does not sit on the probe axis, it has been observed that the stylus motion does not follow a single axis, but can start to move in an elliptical or circular motion at a resonant frequency. This has the effect of generating a resultant signal from the strain gauges with a mean direct current (DC) level that exceeds the trigger threshold and can cause the probe to trigger unexpectedly (i.e. falsely) when the stylus is in free space. This effect will be described in more detail below with reference to FIGS. 6 to 8.

FIG. 6 shows the resonant circular motion (R) that can be imparted to the stylus by machine vibration. This stimulus is a resonant response from the probe and stylus combination that causes the stylus to oscillate in a multi-axis motion (i.e. elliptical or circular). The strain gauge signals 80a, 80b and 80c generated by the three strain gauge elements 50a, 50b and 50c in the presence of such circular stylus motion are illustrated in FIG. 7.

FIG. 8 shows the resultant deflection signal 94 that is generated using the MSOS technique. It can be seen that the magnitude of the resultant deflection signal 94 has a DC offset that is greater than the trigger threshold and which will thus defeat the existing time-based trigger filters of the type described above (i.e. such filters will falsely indicate the stylus has been deflected due to contact with an object and issue a trigger signal). The resultant deflection signals 90 and 92 generated using the RAS and FPTP techniques respectively also exhibit a DC offset that mimics the effect of the stylus being in contact with an object. This multi-axis oscillatory motion thus allows the magnitude of the resultant output to increase beyond a threshold for an extended period of time, but without the stylus being in contact with any object.

The trigger unit 22 of the measurement probe 2 described with reference to FIG. 1 is configured to analyse the individual sensor signals that are used to generate the resultant magnitude signal to determine whether the probe stylus has in fact touched a surface or is oscillating in free space. In this manner, the trigger unit 22 provides immunity to the generation of a false trigger signal due to the oscillatory motions mentioned above. The technique employed by the trigger unit 22 will be described below, but it would of course be possible to implement the analysis in a variety of alternative ways.

Referring to FIGS. 9 and 10, the resultant deflection signal 100 is plotted, along with the three strain gauge signals 102a, 102b and 102c from the three strain gauge sensor elements, as a function of time.

At the time $t_1$, the above mentioned multi-axis (e.g. circular) motion of the stylus begins. This causes the strain gauge signals 102a, 102b and 102c to vary sinusoidally, but with a relative phase shift between the signals from the different strain gauge sensors. The resultant deflection signal 100 derived from the MSOS combination of the three strain gauge signals 102a, 102b and 102c rapidly increases after the multi-axis motion begins and the trigger threshold 104 is crossed at the time $t_2$.

The crossing of the trigger threshold 104 at the time $t_2$ starts the timer of the basic trigger filter. As explained above, the basic trigger filter monitors the resultant deflection signal 100 to check it exceeds the trigger threshold 104 for a predefined time interval ($t_1$) before it then issues a trigger signal (T) to indicate the stylus has contacted an object. At the time $t_2$, the trigger unit 22 also separately analyses the three strain gauge signals 102a, 102b and 102c. In particular, the trigger unit 22 determines if any of the three strain gauge signals 102a, 102b and 102c transition from positive to negative amplitude (or vice versa) and therefore cross through their respective zero (null) points. In this example, zero crossing are detected for the three strain gauge signals 102a, 102b and 102c at the times t4, t3 and t5 respectively. This is shown in FIG. 9 and also in the expanded view of the relevant part of FIG. 9 that is provided as FIG. 10.

The fact that the zero (null) point is crossed by all three strain gauge signals 102a, 102b and 102c indicates that the stylus has not made contact with a surface but is instead oscillating in free space (e.g. in a circular or elliptical manner). At the time $t_5$ (i.e. where the final strain gauge signal 102c crosses the zero point) the trigger unit 22 can be certain that the resultant deflection signal 100 exceeding the trigger threshold 104 at time $t_1$ cannot be due to a stylus deflection as a result of stylus contact with a surface. The trigger signal (T) that would otherwise occur after the filter delay period $t_1$ is thus cancelled or supressed by the trigger unit 22. In this manner, the trigger unit 22 effectively rejects any (false) trigger signals that would result from oscillatory stylus motion.

As explained above, the trigger unit 22 begins assessing whether each of the three strain gauge signals 102a, 102b and 102c crosses the zero point after the time $t_2$. It is, however, not necessary to precisely measure the actual time each zero crossing occurs, all that matter is that such a change of state (i.e. positive to negative, or negative to positive) has occurred. This means that the sampling rate of the strain gauge signals 102a, 102b and 102 by the trigger unit 22 can be relatively slow in comparison to the frequency of stylus oscillation. For example, the state of the strain gauge signals can be checked at twice the maximum frequency of stylus oscillation that is expected for the stylus being used or for any styli that might be used with the measurement probe. The trigger unit 22 is thus arranged to determine the state (i.e. above zero or below zero) of each strain gauge signals 102a, 102b and 102 at the time $t_2$. Once this initial state of each strain gauge signal is known, it can be determined if a zero crossing has occurred for each strain gauge element by monitoring whether the state of each strain gauge signal has transitioned from a positive to a negative value or vice versa. If a zero crossing is detected for each strain gauge element signal within the filter delay period $t_1$, the trigger unit 22 is able to disregard the trigger event as arising from a resonant vibration.

It should be noted here that the zero points shown in FIGS. 9 and 10 equate to the null reading that is obtained from the three strain gauge elements 50a, 50b and 50c in the absence of any probe motion or vibration. Variations from the null point in the positive and negative directions thereby relate to the relevant strain gauge elements being stretched or compressed by the additional forces applied to them by the stylus deflection. Although the terms "zero" and "zero-crossing" are used herein for convenience, the null points could be set at any arbitrary value.

After detection of the third zero-crossing, the trigger unit 22 is still generating a resultant deflection signal 100 that exceeds the trigger threshold. If this condition was subsequently ignored, the measurement probe would be "blind" to any actual contact between the stylus and an object. This could result in the measurement probe being driven into the machine tool structure, which could potentially destroy or seriously damage the measurement probe or the machine tool itself. For this reason, as soon as the trigger unit 22 rejects the resultant deflection signal exceeding the trigger threshold as being due to oscillatory motion and not contact with an object, it immediately restarts the basic trigger filter process. In other words, the process which started at time t2 is repeated. This repetition is continued until the stylus oscillation stops. This oscillation may stop without the stylus making contact with an object, in which case the resultant deflection signal 100 drops back below the trigger threshold and no trigger signal is issued. Alternatively, the oscillation may stop because the stylus does contact an object thereby damping the oscillatory motion. In this latter case, the resultant deflection signal exceeds the trigger threshold for the full duration of the filter delay period and, in the absence of the zero-crossings indicating oscillatory stylus motion, the trigger unit 22 issues a trigger signal to the machine tool.

Referring to FIG. 11, the operation of the trigger unit 22 during a period in which there is a free-space stylus oscillation of stylus without an object being contacted is described in more detail. The resultant deflection signal 110, generated from the three strain gauge signals using a modified sum-of-square expression, is plotted as a function of time. The resultant deflection signal 110 is compared to a trigger threshold 112. The digital output 114 takes a low value "0" when the resultant deflection signal 110 is below the trigger threshold 112 and a high value "1" when the resultant deflection signal 110 is above the trigger threshold 112.

The oscillatory stylus motion causes the digital output 114 to change from its low state to its high state at the time $S_1$. The trigger filter timer starts at $S_1$ and begins to monitor whether the digital output 114 stays high for the whole of the filter delay period $t_1$. The detection that each strain gauge signal has crossed the zero level occurs at time $S_2$ which is before the end of the filter delay period $t_1$. Meeting the zero-level crossing condition also resets the trigger filter timer. In other words, the filter timer is reset to zero at the time S2. It is then detected that each strain gauge signal has crossed the zero level at time S3, which acts to reset the trigger filter timer again. This trigger resetting process is repeated until the oscillatory motion reduces such that the resultant deflection signal 110 drops below the trigger threshold 112 at the time R. This also causes the digital output 114 to drop from a high to low value, at which point the trigger filter is exited without a trigger signal being issued. The false trigger that would otherwise have issued without the additional analysis of the zero-level crossings of the individual strain gauge signals is thus prevented.

Referring to FIG. 12, there is shown measurement probe apparatus 150 comprising a measurement probe 152 having a similar strain gauge arrangement to that described above. The measurement probe 152 includes an analyser (not shown) that can generate a preliminary trigger signal and a trigger confirmation signal. A coordinate positioning apparatus 154 is also shown that has an analyser interface 156 for receiving the preliminary trigger signal and the trigger confirmation signal from the measurement probe apparatus 150. In particular, the measurement probe apparatus 150 is connected to the analyser interface 156 by a preliminary trigger signal line 158 and a trigger confirmation signal line 160.

FIG. 13 plots, as a function of time, the signals generated within the measurement probe apparatus 150 as the measurement probe is brought into contact with an object. The lowermost plot (labelled C) shows the individual strain gauge signals 170a, 170b and 170c generated by the three strain gauges of the measurement probe. The uppermost plot (labelled A) shows the resultant deflection signal 180 that is generated by a sum-of-squares addition of the three strain gauge signals 170a, 170b and 170c. The middle plot (labelled B) shows the state of the preliminary touch trigger signal line 158 and the touch trigger confirmation signal line 160.

Referring first to the lowermost plot of FIG. 13, the individual strain gauge signals 170a, 170b and 170c can be seen to oscillate about the 0V level as the measurement probe is moved around in free space by the coordinate positioning apparatus prior to the stylus making contact with an object. The strain gauge signal 170a increases rapidly and crosses the 1V threshold as the stylus is brought into contact with an object, whereas the other strain gauge signals 170b and 170c drop below 0v at the same time. The resultant (sum-of-squares) deflection signal 180 shown in the uppermost plot also rapidly exceeds the 75 mV threshold when contact with an object is made. However, it can also be seen that the same resultant deflection signal 180 also transiently crosses the same 75 mV threshold whilst the measurement probe is being moved around in free space due to the oscillations of the individual strain gauge signals.

The measurement probe is arranged to generate a preliminary trigger signal whenever the resultant deflection signal 180 crosses the 75 mV threshold. As shown in the middle plot, the preliminary touch trigger signal line 158 is held high when the resultant deflection signal 180 is below the 75 mV threshold and dropped low whenever the 75 mV threshold is exceeded. In addition, each of the strain gauge signals 170a, 170b and 170c are compared to a 1V threshold. The touch trigger confirmation signal line 160 is held high until (a) the preliminary touch trigger signal line 158 drops low and (b) at least one of the individual strain gauge signals crosses the 1V threshold and remains above that threshold for a pre-set period (10 ms in this example). When these two conditions are met, the touch trigger confirmation signal line 160 is dropped to its low state.

The analyser interface 156 of the coordinate positioning apparatus 154 is configured to monitor the preliminary touch trigger signal line 158 and to record the position of the spindle holding the measurement probe whenever the preliminary touch trigger signal line 158 drops from high to low. If this is followed by the touch trigger confirmation signal line 160 also dropping low (i.e. because contacted has been confirmed) the recorded spindle position (i.e. recorded in response to the preliminary touch trigger signal line 158 dropping low) is used to generate a surface position measurement. In this manner, the metrology is still based on the resultant deflection signal 180 crossing the 75 mV but a surface position is only reported if this is followed by the confirmation signal that indicates there are no free-space stylus oscillations.

The skilled person would recognise that the above embodiments merely describe a number of ways in which the present invention could be implemented and should not be seen as limiting the scope of the invention. For example, the stylus does not need to be oscillating in a particular circular or elliptical manner for the analysis to work. The zero-crossing analysis will act to reject any vibration stimulus that causes the DC level of the resultant output to exceed the trigger threshold, including complex harmonic distortion of the strain gauge signals. The exact manner of detecting oscillatory motion should also not be seen as limiting. Any technique (peak recognition, filtering etc) that allows phase-shifted oscillatory motion to be determined from the set of sensor signals could be applied. The examples outlined above also relate to a measurement probe having three strain gauge measurement sensors, but could just as easily be applied to a measurement probe having two or more sensors of any type (e.g. piezo, inductive, magnetic, capacitive, optical sensors etc). It should also be noted that the measurement probe may comprise a dedicated touch trigger measurement probe as described above, or a scanning probe that is operable in a touch trigger mode.

The invention claimed is:

1. A measurement probe apparatus, comprising;
   a probe body,
   a stylus that is deflectable relative to the probe body,
   one or more sensor elements for sensing deflection of the stylus relative to the probe body and generating sensor signals indicative of stylus deflection, and
   an analyser for analysing the sensor signals, the analyser being arranged to combine a plurality of the sensor signals to generate a resultant deflection signal for comparison to a deflection threshold,
   wherein the analyser is also arranged to detect oscillatory motion of the stylus by analysing one or more of the sensor signals, whereby stylus contact with an object can be determined from the resultant deflection signal crossing the deflection threshold and no oscillatory motion of the stylus being detected from the analysis of the one or more sensor signals.

2. An apparatus according to claim 1, comprising a trigger unit for issuing a trigger signal to indicate the stylus has made contact with the object, wherein the trigger unit comprises the analyser and the trigger unit only issues the trigger signal when the resultant deflection signal crosses the deflection threshold and no oscillatory motion of the stylus is detected from the analysis of the one or more sensor signals.

3. An apparatus according to claim 2, wherein the trigger unit applies a trigger filter such that the trigger signal is issued a predetermined time interval after the resultant deflection signal crosses the deflection threshold.

4. An apparatus according to claim 3, wherein the analyser of the trigger unit is arranged to detect oscillatory motion of the stylus by analysing said at least one of the sensor signals during the predetermined time interval, the trigger unit only issuing the trigger signal if no oscillatory motion of the stylus is detected during the predetermined time interval.

5. An apparatus according to claim 2, wherein the trigger unit and a communications module are located within the probe body, the communications module being configured to transmit the trigger signal generated by the trigger unit to an associated probe interface.

6. An apparatus according to claim 5, wherein the communications module transmits the trigger signal to the associated probe interface over a wireless communications link.

7. An apparatus according to claim 1, wherein the analyser is configured to issue a preliminary trigger signal when the resultant deflection signal crosses the deflection threshold and a trigger confirmation signal when no oscillatory motion of the stylus is detected from the analysis of the one or more sensor signals.

8. An apparatus according to claim 7, further comprising an analyser interface for receiving the preliminary trigger signal and the trigger confirmation signal from the analyser, the analyser interface determining that stylus contact with an object has been made on receipt of the preliminary trigger signal and the subsequent receipt of the trigger confirmation signal.

9. An apparatus according to claim 1, wherein the analyser is configured to analyse each of a plurality of the sensor signals to detect oscillatory motion of the stylus, the analysis performed by the analyser comprising ascertaining if there is a periodic variation in the magnitude of each of the plurality of sensor signals.

10. An apparatus according to claim 9, wherein the variation in the magnitude of each of the plurality of sensor signals is measured relative to its sensor signal null level, the sensor signal null level being the sensor signal produced in the absence of an external force being applied to the stylus.

11. An apparatus according to claim 9, wherein the analyser detects oscillatory motion of the stylus by determining whether each sensor signals crosses a threshold level within a pre-set time period.

12. An apparatus according to claim 9, wherein the analyser determines whether at least one of the plurality of sensor signals remains above or below a threshold level within a pre-set time period, oscillatory motion being present if none of the plurality of sensor signals remain above or below the threshold level for the pre-set time period.

13. An apparatus according to claim 1, wherein the one or more sensor elements comprises a plurality of sensor elements.

14. An apparatus according to claim 13, wherein the plurality of sensor elements comprises a plurality of strain gauge sensor elements.

15. A method of measuring contact with an object using a measurement probe apparatus comprising a probe body, a stylus that is deflectable relative to the probe body, and one or more sensors for sensing deflection of the stylus relative to the probe body and generating a plurality of sensor signals, the method comprising the steps of;
  (i) combining at least two of the plurality of sensor signals to generate a resultant deflection signal, and
  (ii) comparing the resultant deflection signal generated in step (i) to a deflection threshold,
characterised by the steps of;
  (iii) analysing at least one of the plurality of sensor signals to detect oscillatory motion of the stylus, and
  (iv) indicating the stylus has contacted an object only if step (ii) indicates the resultant deflection signal has exceeded the deflection threshold and step (iii) does not detect oscillatory motion of the stylus.

\* \* \* \* \*